(12) United States Patent
Miyashita

(10) Patent No.: US 6,948,374 B2
(45) Date of Patent: Sep. 27, 2005

(54) CAPACITIVE PRESSURE SENSOR AND ITS MANUFACTURING METHOD

(75) Inventor: Haruzo Miyashita, Fujiyoshida (JP)

(73) Assignee: Anelva Corporation, Fuchu (JP)

( * ) Notice: Subject to any disclaimer, the term of this patent is extended or adjusted under 35 U.S.C. 154(b) by 40 days.

(21) Appl. No.: 10/778,243

(22) Filed: Feb. 17, 2004

(65) Prior Publication Data

US 2004/0182165 A1 Sep. 23, 2004

(30) Foreign Application Priority Data

Feb. 17, 2003 (JP) ........................................ 2003-037618

(51) Int. Cl.⁷ ............................................... G01L 9/12
(52) U.S. Cl. ............................................. 73/718; 73/724
(58) Field of Search ........................ 73/718, 724, 706, 73/714, 754; 361/283.1, 283.2, 283.3, 283.4

(56) References Cited

U.S. PATENT DOCUMENTS

| | | | | |
|---|---|---|---|---|
| 5,271,277 A | * | 12/1993 | Pandorf | 73/724 |
| 5,396,803 A | * | 3/1995 | Ferran | 73/724 |
| 5,939,639 A | * | 8/1999 | Lethbridge | 73/724 |
| 6,200,494 B1 | * | 3/2001 | Manini et al. | 252/181.7 |
| 6,499,354 B1 | * | 12/2002 | Najafi et al. | 73/723 |
| 6,598,483 B2 | | 7/2003 | Miyashita et al. | 73/718 |
| 6,612,176 B2 | * | 9/2003 | Poulin et al. | 73/708 |
| 6,837,111 B2 | * | 1/2005 | Mei | 73/718 |

FOREIGN PATENT DOCUMENTS

| | | |
|---|---|---|
| JP | 08-035899 | 2/1996 |
| JP | 2000-019044 | 1/2000 |
| JP | 2001-201417 | 7/2001 |
| JP | 2002-055008 | 2/2002 |

* cited by examiner

*Primary Examiner*—William Oen
(74) *Attorney, Agent, or Firm*—Burns, Doane, Swecker & Mathis LLP

(57) ABSTRACT

A capacitive pressure sensor and its manufacturing method can simplify the alignment and the bonding process in a vacuum, and stably carry out the bonding process. The capacitive pressure sensor includes an insulating, first substrate with a capacitance electrode, a second substrate which has a diaphragm electrode so as to separate a vacuum chamber and a pressure-measuring chamber on respective surfaces, and an insulating, third substrate with a gas inlet. The substrates are bonded in a manner that the capacitance electrode faces the diaphragm electrode and the pressure-measuring chamber leads to the gas inlet. In addition, a getter chamber is formed in the same surface of the second substrate as the pressure-measuring chamber, and the getter chamber is connected to the vacuum chamber.

6 Claims, 5 Drawing Sheets

(A)

(B)

(A)

(B)

CAPACITIVE PRESSURE SENSOR AND ITS MANUFACTURING METHOD

CROSS-REFERENCE TO RELATED APPLICATIONS

The present application claims the priority of JP 2003-037618 filed in Japan Feb. 17, 2003, the entire contents of which are incorporated herein by reference.

BACKGROUND OF THE INVENTION

1. Field of the Invention

The present invention relates to a capacitive pressure sensor and its manufacturing method and, more particularly, to a capacitive pressure sensor which simplifies a manufacturing process and improves yield.

2. Description of Related Art

In the manufacture of electronic components and semiconductor products, thin film deposition processes and etching processes are inevitably carried out in vacuum equipment. Such processes are generally carried out by keeping the pressure in the vacuum equipment constant with the aid of a pressure measuring means such as a capacitive vacuum sensor. Most commercial capacitive vacuum sensors have been manufactured by conventional machining; however a new type of pressure sensor and its manufacturing method by using micromachining techniques is proposed because it enables sensor miniaturization, mass production and cost reduction (JP2002-55008A, JP2001-201417A and JP2000-19044A). The micromachining technique makes use of semiconductor manufacturing techniques such as photolithography, film deposition, etching and the like. Moreover, commercially available materials such as a silicon wafer, a glass substrate and the like are used.

One example of conventional capacitive vacuum sensors manufactured by using a micromachining technique is shown in FIG. 4. FIG. 4A is a schematic exploded, perspective view showing a pressure sensor, and FIG. 4B is a schematic sectional view showing a pressure sensor which is connected to an electric circuit and placed in a case for practical use.

The pressure sensor is composed of a glass substrate 1, an SOI (Silicon On Insulator) substrate 2, and a glass substrate 3, which are fixed to each other in tight contact using a bonding technique. Here, the SOI substrate 2 generally consists of a silicon layer 4, a buried oxide layer 5, and a base silicon layer 6. A vacuum chamber groove 7 is formed in the silicon layer 4, and its closed space sealed with the glass substrate 1 is a vacuum. A capacitance electrode 8 and a reference electrode 9 are formed on the surface of glass substrate 1 which faces the vacuum chamber groove 7, and are respectively connected to a capacitance electrode terminal 10 and a reference electrode terminal 11 which are formed through the glass substrate 1.

The parts of base silicon 6 and buried oxide layer 5 which face the capacitance electrode 8 are removed to form a pressure-measuring chamber groove 12. As a result, the part of silicon layer 4 facing the capacitance electrode 8 acts as a diaphragm electrode 13. The diaphragm electrode 13 is electrically connected to a diaphragm electrode terminal 14 formed on the glass substrate 1.

Since the vacuum chamber must be kept at a high vacuum, a groove 27' is formed in the glass substrates 1 and a non-evaporable getter, for example, is placed therein to absorb a residual gas inside the vacuum chamber 7. The pressure sensor is pressed on an O-ring 17 at the periphery portion of the glass substrate 3 by a press plate 16. Thus, the sensor is fixed on a base adaptor 18 with a vacuum seal.

A gas inlet 19 is formed in the central part of glass substrate 3 to make the pressure of pressure-measuring space 20 equal to that of the pressure-measuring chamber 12. Therefore, the diaphragm electrode 13 deflects depending on the pressure difference between the vacuum chamber 7 and the pressure-measuring space 20. The degree of diaphragm deflection can be obtained from the variation of electrostatic capacitance between the capacitance electrode terminal 10 and the diaphragm electrode terminal 14. Here, a reference electrode 9 is formed in the vicinity of the capacitance electrode 8 in order to correct the error due to the mechanical distortion which is caused when the ambient temperature changes because of the difference in the thermal expansion coefficient of sensor components.

In addition, a plurality of small projections 23 are formed on the diaphragm electrode 13 in order to prevent the diaphragm electrode 13 from sticking to the capacitance electrode 8 when the pressure of the pressure-measuring space 20 becomes high and the diaphragm comes in contact with the capacitance electrode.

Next, the manufacturing process of the pressure sensor shown in FIG. 4A is explained by referring to FIG. 5.

First, an SOI substrate 24 for forming the capacitance electrode and the reference electrode is prepared (FIG. 5A). An oxide film 25 is formed on the surface and patterned (FIG. 5B). Then, the exposed portions of the silicon layer 4 and the buried oxide layer 5 of the SOI substrate 24 are removed (FIG. 5C). The glass substrate 1 in which grooves 26 for electrode terminal and a getter chamber groove 27' are formed is bonded with the SOI substrate 24 (FIG. 5D), and thereafter only the base silicon layer 6 is etched and removed (FIG. 5E).

Similarly, an oxide film 25 is formed on the SOI substrate 2 and patterned (FIG. 5F). A silicon layer 4 is partially etched (FIG. 5G). Then, the oxide film 25 on the upper surface is patterned again, and the silicon layer 4 is etched until it comes to the thickness of diaphragm electrode (FIG. 5H). Then, after the oxide film on the lower surface of base silicon layer 6 is patterned, small projections 23 are formed using a metal material such as aluminum or a silicon oxide film on the region which is to be the diaphragm electrode (FIG. 5I).

Next, the glass substrate 1 and the SOI substrate 2 are aligned, placing a getter 15 inside the getter chamber groove 27' formed in the glass substrate 1, and then bonded in a vacuum by the anodic bonding method (FIG. 5J). After that, the base silicon layer is etched until the buried oxide layer is exposed (FIG. 5K). The glass substrate 1 is etched by using, for example, a hydrogen fluoride solution to expose the capacitance electrode 8 and the reference electrode 9 inside the grooves 26 for electrode terminal, while the buried oxide layer 5 underneath the diaphragm electrode 13 and the oxide film 25 on the base silicon layer 6 are removed at the same time. Thereafter, metal electrodes 28 are formed inside the grooves 26 for electrode terminal and on the surface of glass substrate 1, which are respectively connected to the capacitance electrode 8, the reference electrode 9, and the silicon layer 4 (FIG. 5L). Then, the glass substrate 3 with gas inlet 19 is bonded with the base silicon layer 6 of the SOI substrate 2, and finally the capacitance electrode terminal 10, the reference electrode terminal 11, and the diaphragm electrode terminal 14 are connected to terminal pins 30 using a conductive adhesives 29 to complete the pressure sensor (FIG. 5M).

OBJECTS AND SUMMARY

The micromachining technique enables the processing in the range of micrometers since it is based on semiconductor manufacturing techniques. Thus, it has advantages in processing accuracy, mass production and the cost reduction as compared with the conventional machining method. However, when a capacitive pressure sensor is manufactured by the micromachining method, the relative positions of the glass substrate 1 which has the capacitance and reference electrodes on its back surface to the SOI substrate 2 should be adjusted mechanically with alignment accuracy of 100 $\mu$m or less. Here, the alignment accuracy depends on the size and required performance of the sensor.

Although the alignment with accuracy of about 100 $\mu$m in general can be easily attained, the situation is different in the case where the pressure sensor should be sealed while the inside is kept at a vacuum. That is, in order to evacuate the inside of vacuum chamber groove, thick spacers should be placed between the glass substrate and the SOI substrate when the alignment of the substrates is carried out. After the alignment is carried out in the atmosphere, the substrates are placed in a vacuum anodic bonding apparatus. The substrates are heated while the apparatus is evacuated. The spacers are drawn out at this stage to carry out the anodic bonding.

Here, the non-evaporable getter 15 with a thickness of about 300 $\mu$m is placed inside the groove 27' formed in the glass substrate 1. The depth of groove 27' is usually restricted to about 350 $\mu$m or less because of the thickness limitation of glass substrate 1 and securing the mechanical strength. Therefore, when the spacers are drawn out, the following accidents tend to easily take place. That is, the relative position of the substrates may change, or the non-evaporable getter may move from the original position to be caught between the glass substrate 1 and the SOI substrate 2, which makes impossible the vacuum seal of the pressure sensor. Thus, there is a disadvantage of low yield and low productivity.

As mentioned, the glass substrate and the SOI substrate must be bonded in a high vacuum in the conventional method. And moreover, it must be carried out with paying attention to the alignment of the substrates, the sealed pressure inside the pressure sensor, the arrangement of getter, and the like. If even one of them is not achieved, the product yield falls remarkably.

Under such circumstances, an object of the present invention is to provide a capacitive pressure sensor and its manufacturing method which can simplify and stabilize the alignment and the bonding process in a vacuum. Another object of this invention is to provide a capacitive pressure sensor which can be produced without high alignment accuracy when the bonding process is carried out in a vacuum.

An embodiment of the present invention includes a capacitive pressure sensor that comprises an insulating, first substrate with a capacitance electrode, a second substrate which has a diaphragm electrode so as to separate a vacuum chamber and a pressure-measuring chamber on respective surfaces, and an insulating, third substrate with a gas inlet. The substrates are bonded in such a manner that said capacitance electrode faces said diaphragm electrode and said pressure-measuring chamber leads to said gas inlet. Furthermore, a getter chamber is formed on the same surface of said second substrate as said pressure-measuring chamber groove, and the getter chamber is connected to the vacuum chamber.

This configuration provides enough space for the getter chamber to construct a pressure sensor without precise alignment. Consequently, the bonding process in a vacuum is so easy that the production yield and the productivity will be greatly improved.

The second substrate is preferably an SOI (Silicon On Insulator) substrate composed of a silicon layer, a buried oxide layer and a base silicon layer. Here, the vacuum chamber is formed in the silicon layer, and said pressure-measuring chamber and getter chamber are formed in said base silicon layer.

By employing an SOI substrate, the vacuum chamber, the pressure-measuring chamber, and the getter chamber can be formed with less process steps and with high precision and sufficient reproducibility.

It is preferable to form a plurality of small projections of silicon oxide on the surface of said capacitance electrode. However, it is difficult in the case of the conventional pressure sensor to form projections on the capacitance electrode because the getter chamber in the first substrate hinders photolithography. In an embodiment of this invention, on the other hand, the getter chamber is not formed in the first substrate. This makes it possible to pattern the oxide film on the capacitance electrode and therefore to form the projections on the capacitance electrode with less process steps. These projections reduce the likelihood that the diaphragm electrode will stick to the capacitance electrode. Thereby, the diaphragm electrode can be easily separated from the capacitance electrode when the pressure sensor is evacuated again after exposed to a high pressure, for example, the atmospheric pressure. Thus, stable pressure measurements can be maintained.

A manufacturing method for a capacitive pressure sensor in which an insulating, first substrate with a capacitance electrode, a second substrate being an SOI substrate composed of a silicon layer where a vacuum chamber and a diaphragm electrode are formed, a buried oxide layer, and a base silicon layer where a pressure-measuring chamber and a getter chamber are formed; a third substrate with a gas inlet are bonded in a manner that said capacitance electrode faces said diaphragm, and said pressure-measuring chamber leads to said gas inlet. The method includes bonding said first substrate on which said capacitance electrode is formed with said second substrate on which said vacuum chamber is formed by using anodic bonding method; etching said base silicon layer to form said pressure-measuring chamber and getter chamber; removing said buried oxide layer on said pressure-measuring chamber and said getter chamber by etching technique; removing a part of said silicon layer located between said vacuum chamber and said getter chamber to connect said two chambers; bonding said base silicon layer with said third substrate by using an anodic bonding method after a getter is placed in said getter chamber while the inside of said getter chamber is maintained at a vacuum.

As mentioned, the first substrate (glass substrate) and the second substrate (SOI substrate) can be bonded with high alignment accuracy because the getter is not placed between them when bonded, and furthermore the sealed pressure of the space formed by both substrates does not need to be paid attention (because the substrates can be bonded in the atmosphere). That is, the bonding with higher alignment accuracy becomes possible to realize a smaller pressure sensor.

The manufacturing process will be simplified because the getter chamber can be formed simultaneously during the process to form the diaphragm in the SOI substrate.

Furthermore, since the high alignment accuracy is not required in the bonding process of the second substrate (SOI substrate) and the third substrate, the anodic bonding, which is performed in a high vacuum, can be easily carried out using thick spacers as compared with the conventional method. Consequently, the inside of the sensor can be securely sealed at a high vacuum. The getter chamber can be as deep as the thickness of SOI substrate (about 600 μm, for example), which avoid the accident that the non-evaporable getter moves from the original position to be caught between both substrates and the vacuum seal cannot be carried out consequently.

Furthermore, the capacitance electrode is preferably composed of silicon on which small projections of silicon oxide are formed in such a manner that an SOI substrate composed of a silicon layer, a buried oxide layer, and a base silicon layer is prepared, the portion of said silicon layer and said buried oxide layer are etched and removed except the portion corresponding to said capacitance electrode, said silicon layer is bonded with an insulating substrate, said base silicon layer is etched and removed, and then said buried oxide layer is patterned to form said small projections. Thus, it is not necessary to form a groove for the getter chamber in the glass substrate. The patterning of small projections can be made using photolithography on the capacitance electrode in less process steps.

DETAILED DESCRIPTION OF THE PREFERRED EMBODIMENTS

Here, numeral 1 denotes a first substrate (glass substrate); 2 is a second substrate (SOI substrate); 3 is a third substrate (glass substrate); 4 is a silicon layer; 5 is a buried oxide layer; 6 is a base silicon layer; 7 is a vacuum chamber groove (vacuum chamber); 8 is a capacitance electrode; 9 is a reference electrode; 10 is a capacitance electrode terminal; 11 is a reference electrode terminal; 12 is a pressure-measuring chamber groove (pressure-measuring chamber); 13 is a diaphragm electrode; 14 is a diaphragm electrode terminal; 15 is a non-evaporable getter; 16 is a press plate; 17 is an O-ring; 18 is a base adaptor; 19 is a gas inlet; 20 is a pressure-measuring space; 21 is a detection circuit; 22 is an output terminal; 23 is a projection; 24 is a SOI substrate for electrode formation; 25 is an oxide film; 26 is a groove for an electrode terminal; 27 and 27' are non-evaporable getter chamber grooves (non-evaporable getter chambers); 28 is a metal material electrode; is a conductive adhesive; 30 is a terminal pin, and 31 is a through hole.

The embodiments of this invention will be explained in detail.

Figure 1:
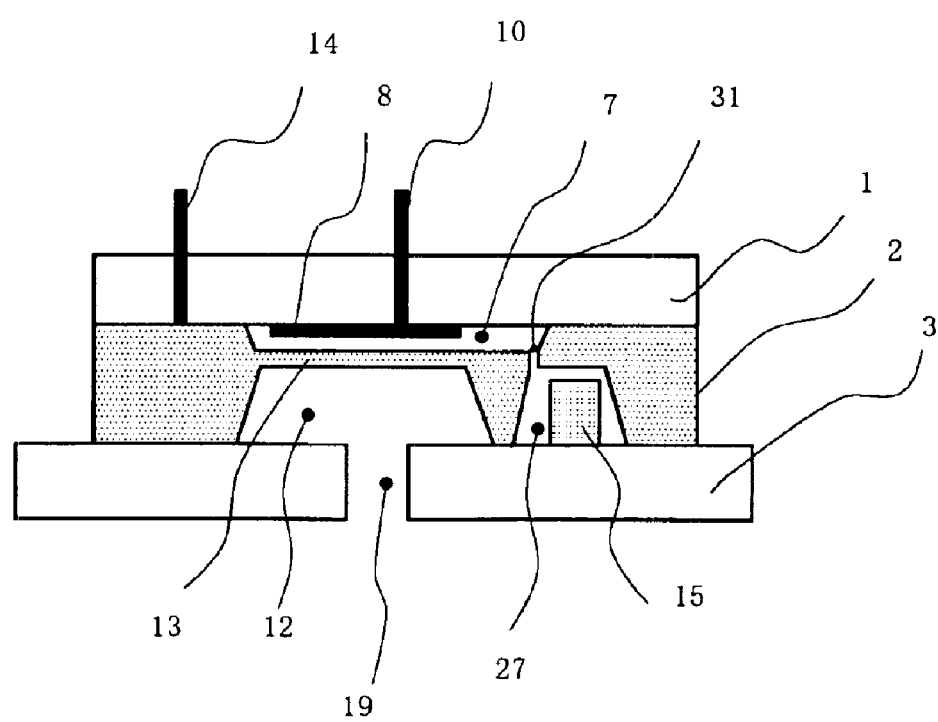
FIG. 1 is a schematic sectional view showing an embodiment of a capacitive pressure sensor of this invention.

FIG. 1 is a schematic sectional view showing a basic configuration of a capacitive pressure sensor of this invention. As shown in FIG. 1, the capacitive pressure sensor is constructed by bonding an insulating, first substrate 1 with a capacitance electrode 8, a conductive, second substrate 2 with a diaphragm electrode 13 in which a vacuum chamber groove 7 and a pressure-measuring chamber groove 12 are formed on respective sides of the diaphragm electrode 13, and a getter chamber groove 27 is formed on the same surface as the pressure-measuring chamber groove, and an insulating, third substrate 3 with a gas inlet 19 so that the getter chamber 27 is communicated with the vacuum chamber 7 by way of a through hole 31. In this invention, Ti, Zr, Hf or their alloys are preferably employed as a non-evaporable getter.

The pressure sensor is mounted so that the pressure of the space to be measured is introduced to the pressure-measuring chamber 12, and is obtained by measuring the electrostatic capacitance between two terminals 10 and 14.

A glass substrate such as Pyrex glass (registered trademark of Corning glass, Corning) or SD2 glass (provided by HOYA) is employed for the insulating, first and third substrates, and a silicon substrate is employed for the second substrate. In particular, an SOI substrate is preferably employed as the second substrate, which simplifies manufacturing process and greatly improves the productivity and yield of pressure sensor. The structure of a capacitive pressure sensor constructed by using an SOI substrate as the second substrate and its manufacturing method are explained by referring to FIGS. 2 and 3.

Figure 2:
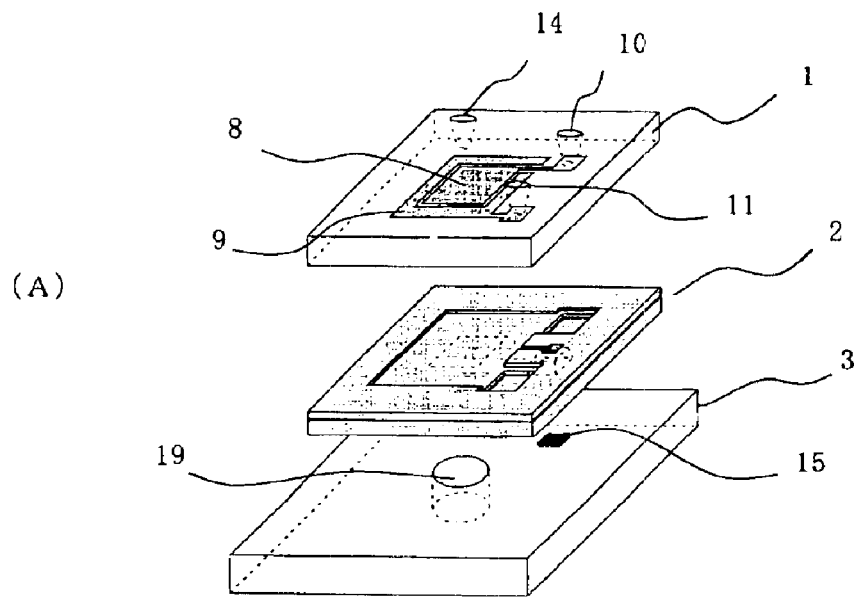
FIG. 2 shows schematic diagrams explaining an embodiment of a configuration of a capacitive pressure sensor using an SOI substrate.
Figure 2:
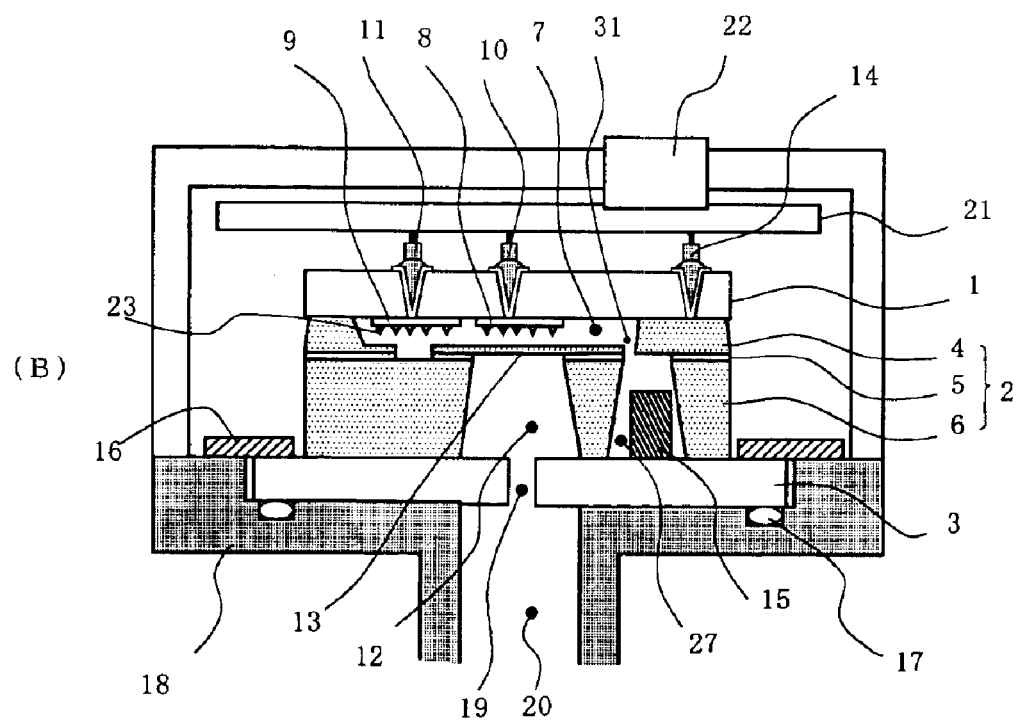

FIG. 2 shows schematic views explaining one example of capacitive vacuum sensors of this embodiment manufactured by the micromachining technique. FIG. 2A is a schematic perspective view showing the configuration of the pressure sensor and FIG. 2B is a schematic sectional view showing the configuration where the pressure sensor is connected to an electric circuit and placed in a case.

As shown in FIG. 2, the pressure sensor is composed of a glass substrate (first substrate) 1, an SOI substrate (second substrate) 2, and a glass substrate (third substrate) 3, and these substrates are fixed by a bonding technique.

A capacitance electrode 8 for measuring electrostatic capacitance together with a diaphragm electrode 13, and a reference electrode 9 for correcting the electrostatic capacitance change with temperature are formed on a glass substrate 1, and respectively connected to a capacitance electrode terminal 10 and a reference electrode terminal 11 by way of the glass substrate 1.

The SOI substrate 2 has a three-layered structure consisting of a silicon layer 4, a buried oxide layer 5, and a base silicon layer 6. A vacuum chamber groove 7 is formed in the silicon layer 4, and a pressure-measuring chamber groove 12 is formed in the region of base silicon layer 6 which is opposite the vacuum chamber groove 7. Therefore, the portion of silicon layer between the vacuum chamber groove 7 and the pressure-measuring chamber groove 12 functions as the diaphragm electrode. The diaphragm electrode 13 is connected to the diaphragm electrode terminal 14 on the glass substrate 1. Furthermore, the getter chamber groove 27 is formed in the base silicon layer 6, and communicated with the vacuum chamber groove 7 by way of the through hole 31. The non-evaporable getter 15 is placed in the getter chamber 27 to absorb residual gas and maintain the vacuum chamber 7 at a high vacuum.

The silicon layer 4 and base silicon layer 6 of the second substrate (SOI substrate) have a thickness of 30–100 μm and 500 μm–1 mm, respectively. The thickness is determined depending on the pressure measuring range, the size of the getter and the like. There is no restriction in the specific resistance of base silicon layer; however, an electrical resistivity of 0.001–0.02 ohm·cm is preferably adopted for the silicon layer. A gas inlet 19 for gas introduction is formed in the third substrate 3 (glass substrate).

These substrates are preferably bonded by using an anodic bonding method described in, for example, JP2002-43585A. Thereby, a firm bonding which is free of gas leakage can be made.

The peripheral portion of the glass substrate 3 is pressed downward by a press plate 16 onto an O-ring 17, and is fixed to a base adaptor 18 with sufficient air-tightness. The pressure of pressure-measuring space 20 becomes equal to that of the pressure-measuring chamber groove 12 because of the gas inlet 19 formed in the glass substrate 3.

Thus, the diaphragm electrode 13 deflects according to the pressure difference between vacuum chamber 7 and the pressure-measuring space 20, and the degree of diaphragm deflection can be obtained from the variation of electrostatic capacitance between the capacitance electrode terminal 10 and the diaphragm electrode terminal 14. In addition, the electrostatic capacitance between the capacitance electrode terminal 10 and the diaphragm electrode terminal 14 also changes with the mechanical distortion which is caused when the ambient temperature changes because of the difference in the thermal expansion coefficient of the sensor components. Therefore, such errors are detected with a detection circuit 21 and corrected with the reference electrode 9 formed in the vicinity of the capacitance electrode 8. Consequently, the pressure of the pressure-measuring space 20 is measured with sufficient accuracy and is outputted as an electrical signal from an output terminal 22.

When the pressure of the space 20 is very high, the diaphragm electrode 13 will be in full contact with the capacitance electrode 8, and sometimes will not separate from the capacitance electrode 8 even after the pressure drops. In order to prevent this problem, a plurality of small projections 23 are formed on the capacitance electrode 8 and the reference electrode 9. For example, the projections which are about 1 $\mu$m high and 20–25 $\mu$m square may be formed at a pitch of 200–250 $\mu$m.

Figure 3:
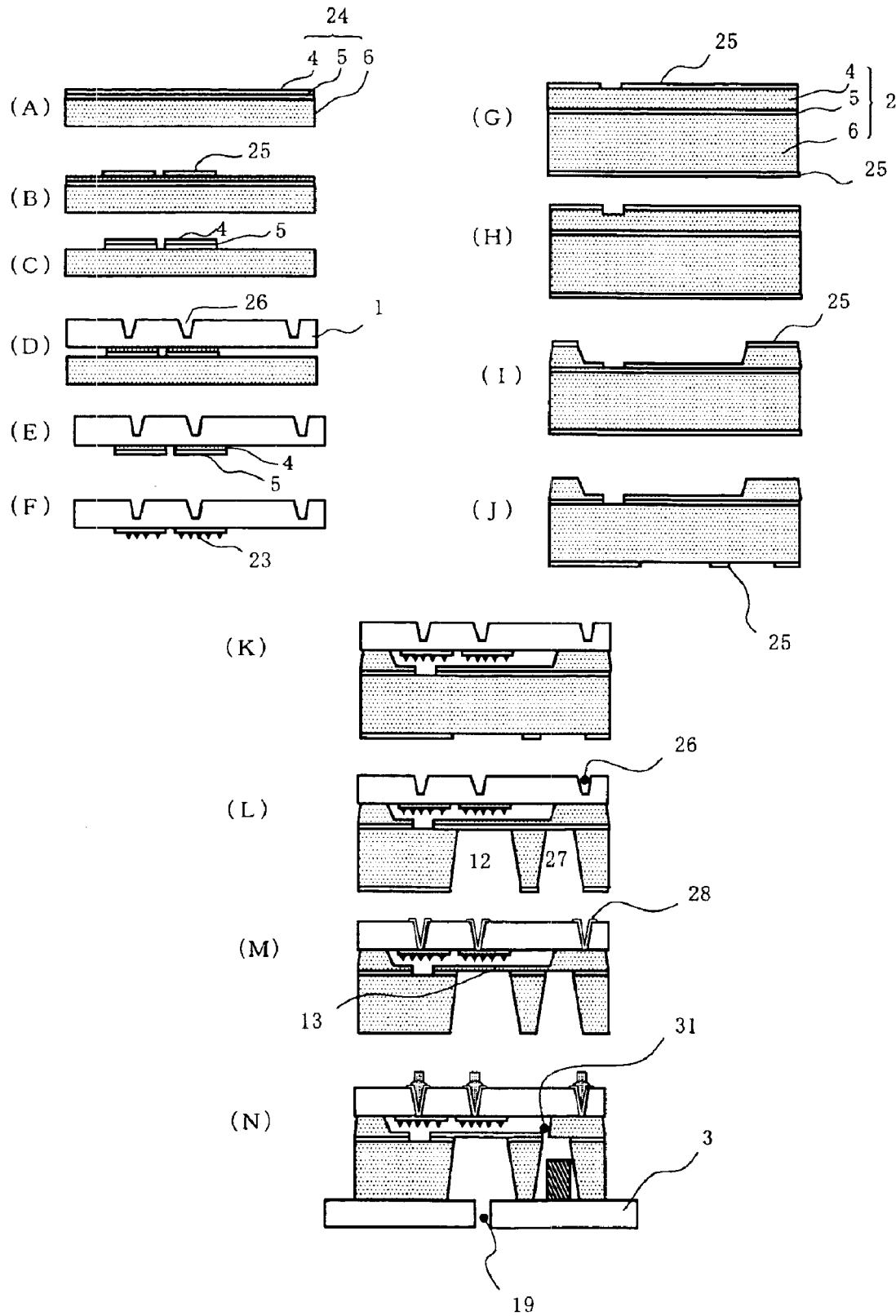
FIG. 3 shows schematic sectional views explaining a manufacture method of the pressure sensor shown in FIG. 2.
Figure 4:
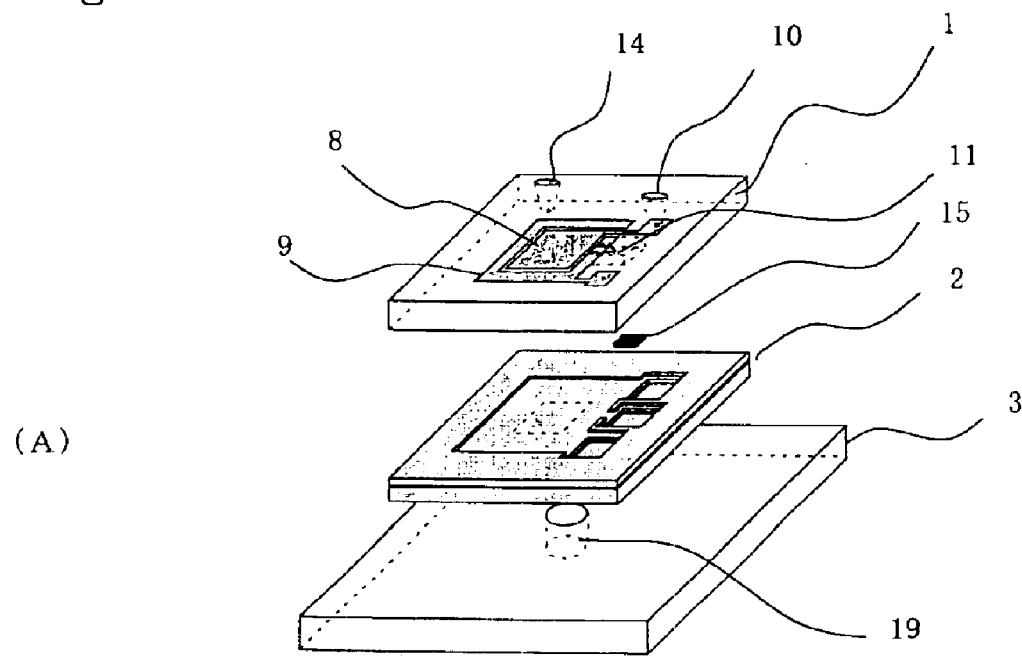
FIG. 4 shows schematic diagrams explaining an example of a conventional capacitive pressure sensor manufactured by using an SOI substrate.
Figure 4:
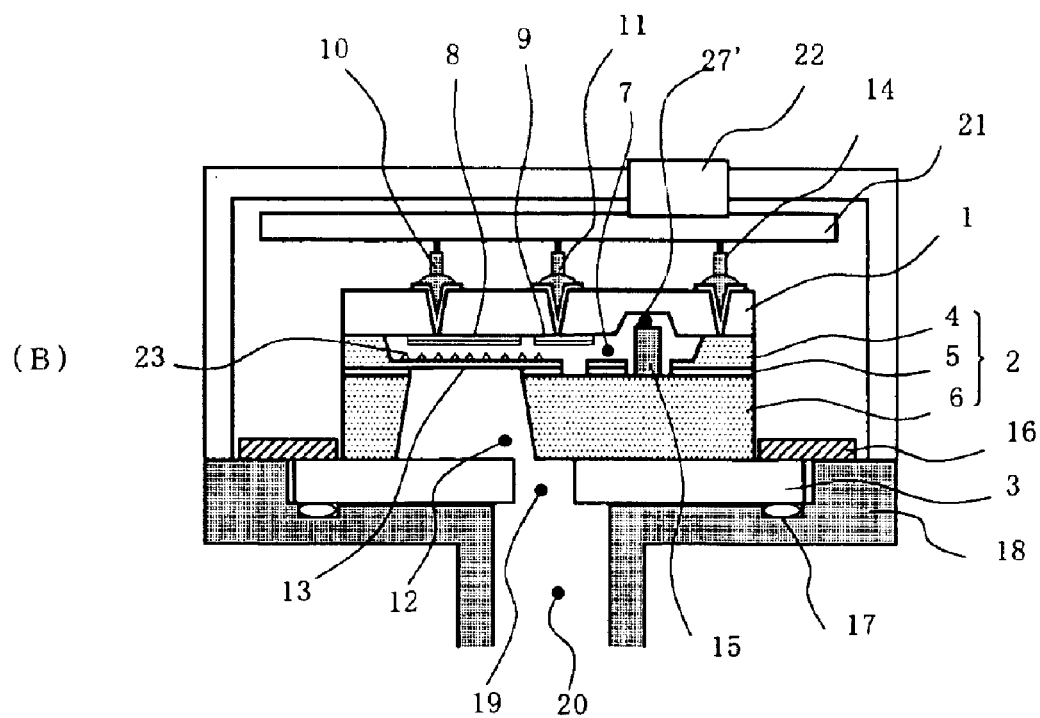
Figure 5:
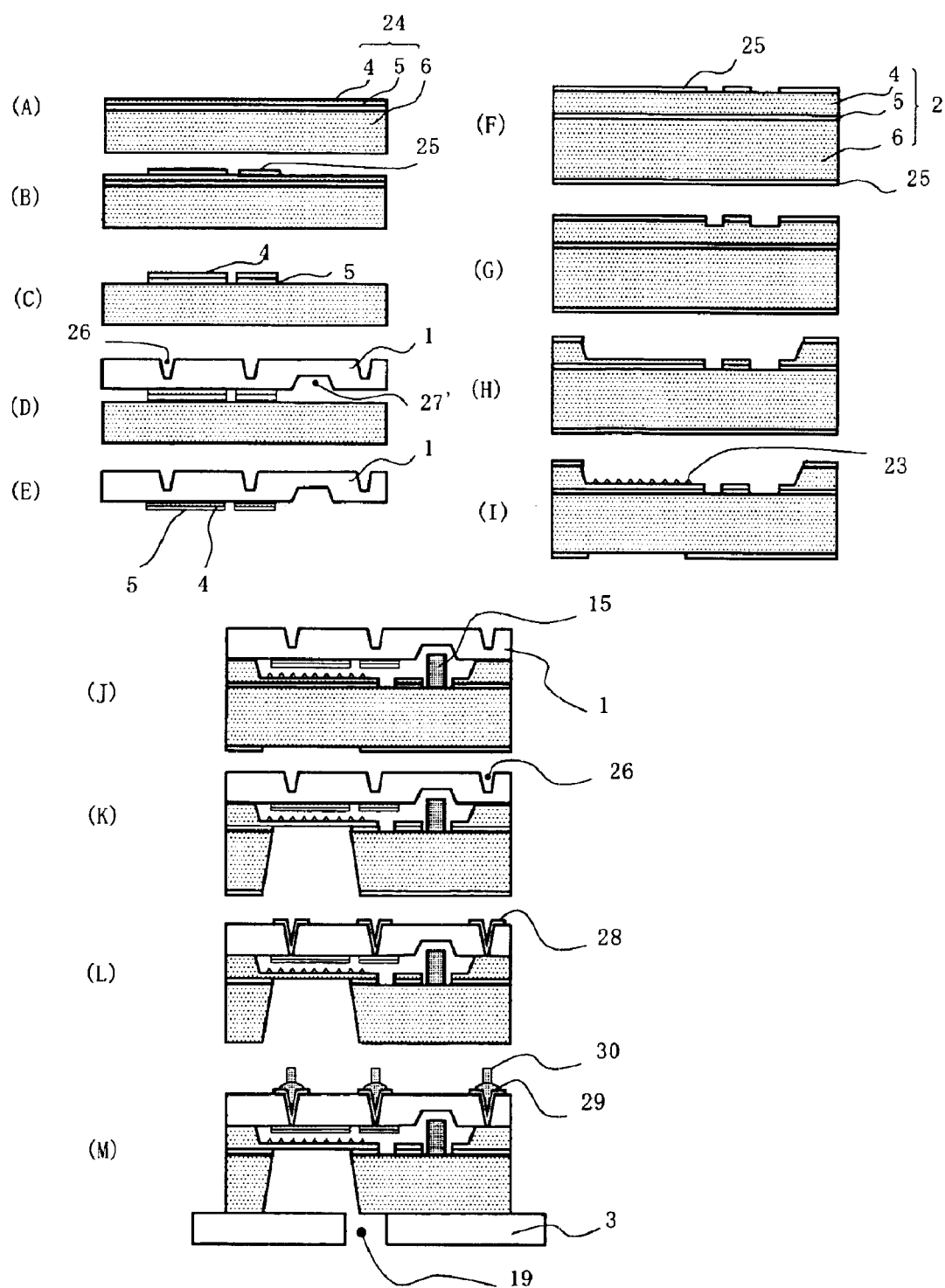
FIG. 5 shows schematic sectional views explaining a manufacturing method of the pressure sensor shown in FIG. 4.

Next, the manufacturing method of the pressure sensor is explained by referring to FIG. 3.

First, an SOI substrate 24 for electrode formation is prepared, which consists of a silicon layer 4 of thickness about 20 $\mu$m, a buried oxide layer 5, and a base silicon layer 6 (FIG. 3A). An oxide film 25 is formed on the surface and then patterned (FIG. 3B). The exposed silicon layer 4 and buried oxide layer 5 of the SOI substrate 24 are etched and removed (FIG. 3C). Next, the SOI substrate 24 is bonded with the glass substrate 1 in which grooves 26 for electrode terminal are formed (FIG. 3D). Then, the base silicon layer 6 is etched and removed (FIG. 3E).

Thus, the silicon layer 4 and buried oxide layer 5 are patterned to form the capacitance electrode and reference electrode on the glass substrate 1. At this stage, the buried oxide layer 5 is processed to form small projections 23 (FIG. 3F). In the case of conventional manufacturing method of pressure sensor, a photoresist cannot be uniformly coated on the glass substrate 1 because the getter chamber groove 27' as deep as about 350 $\mu$m is formed in the glass substrate 1. On the other hand, the getter chamber groove is not required to be provided in the glass substrate 1. It is therefore possible in this embodiment to coat photoresist uniformly and pattern buried oxide layer 5. This means that this invention makes it possible to form the small projections 23 by simply patterning the existing buried oxide layer 5, and hence, it results in a higher productivity, whereas a deposition and patterning process of a silicon oxide film on the diaphragm are necessary in the conventional method.

As to the second substrate, an oxide film 25 is formed on an SOI substrate 2 and patterned (FIG. 3G). A part of silicon layer 4 is etched (FIG. 3H), and the oxide film 25 on the upper surface is further patterned to form a diaphragm electrode. The silicon layer 4 is etched until it becomes a designed thickness, i.e., the thickness of the diaphragm electrode 13 (FIG. 3I). After that, the oxide film 25 on the surface of base silicon layer 6 is patterned (FIG. 3J).

Here, the anodic bonding between the glass substrate 1 (FIG. 3 F) and the SOI substrate 2 (FIG. 3J) is carried out after an alignment of these two substrates. This process is not required to be made in a vacuum. Furthermore, since the non-evaporable getter is not inserted at this stage, it is sufficient to pay attention only to the alignment accuracy of the substrates during this bonding process. In other words, the bonding can be carried out with more precise alignment (FIG. 3K).

Then, the base silicon layer 6 is etched from the lower surface until the buried oxide layer 5 is exposed (FIG. 3L). The inside of grooves 26 for electrode terminals on the glass substrate 1 is etched using, for example, a hydrogen fluoride solution to expose the capacitance electrode 8 and the reference electrode 8, while the exposed buried oxide layer 5 and the oxide film 25 on the lower surface of the base silicon layer 6 are simultaneously removed. Then, metal films are formed inside the grooves for electrode terminal to form the terminals 28 on the upper surface of the glass substrate 1, which are connected to the capacitance electrode, the reference electrode, and the silicon layer (FIG. 3M).

A through hole 31 is provided in the silicon layer which separates the getter chamber groove 27 in the base silicon layer 6 from the vacuum chamber groove 7. Thus, the two grooves become communicated with each other (FIG. 3N). The through hole may be made by using lasers such as a femtsecond laser, or mechanically, for example, by poking with a thin needle. Here, the size of hole 31 is usually 200 $\mu$m–1 mm, and two or more holes can be provided in this invention. Furthermore, the through hole is not necessary to be well-shaped and therefore may have various shapes such as a crack, which is not important functionally.

The getter 15, which is usually a non-evaporable getter, is placed in the getter chamber groove 27, and then the base silicon layer 6 is bonded to the glass substrate 3 in a vacuum (FIG. 3N). Here, the inside of the pressure sensor must be kept at a high vacuum, while the alignment error of a few millimeters between the substrates may be permitted, so long as the pressure-measuring chamber groove 12 is communicated with the gas inlet 19. Furthermore, as the base silicon layer 6 is usually 600 $\mu$m thick, the depth of getter chamber groove may be also 600 $\mu$m. The non-evaporable getter 15 with a thickness of about 300 $\mu$m can be easily placed in the groove without being caught between the glass substrates 3 and the base silicon layer 6, and without causing problems in the anodic bonding.

Finally, the capacitance electrode terminal 10, the reference electrode terminal 11, and the diaphragm electrode terminal 14 are connected to respective terminal pins 30 with a conductive adhesive 29 to complete the pressure sensor.

In this embodiment, the through hole 31 between the vacuum chamber groove 7 and the getter chamber groove 27 is made after the first substrate (glass substrate 1) and the second substrate (SOI substrate) are bonded. However, it is also possible to remove the portion of the silicon layer or the silicon and buried oxide layers corresponding to the through hole before the bonding. In this case, the through hole should be made so small that the etching solution cannot enter into the vacuum chamber groove when the buried oxide layer inside the getter chamber groove is etched.

The getter chamber groove is not formed in the first substrate, but in the base silicon layer of SOI substrate in this invention. Therefore, one is not required to pay attention to the pressure inside the sensor or the position of the non-evaporable getter, and can focus attention only on the alignment of substrates, which makes it possible to improve the quality and the yield of product. In addition, as high-accuracy alignment is not required in the bonding process for vacuum sealing of the sensor, the inside of the sensor can be securely sealed at a high vacuum. Consequently, the yield is further improved and the process time is reduced.

The getter chamber groove can be simultaneously formed in the process to form the diaphragm of pressure sensor. This can decrease the number of manufacturing steps, and therefore simplify the manufacturing process and reduce the manufacturing cost. In order to form the small projections which prevent the adhesion of diaphragm, the conventional manufacturing method requires the film formation process in addition to the patterning process. On the other hand, only the patterning process is used in this invention because the buried oxide layer of SOI substrate itself can be used for forming the projections, which can further simplify manufacturing process and improve productivity.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A capacitive pressure sensor comprising:
   an insulating, first substrate with a capacitance electrode;
   a second substrate which has a diaphragm electrode which separates a vacuum chamber and a pressure-measuring chamber groove on respective surfaces; and
   an insulating, third substrate with a gas inlet;
   said substrates being bonded in such a manner that said capacitance electrode faces said diaphragm electrode and said pressure-measuring chamber leads to said gas inlet;
   wherein a getter chamber is formed on a same surface of said second substrate as said pressure-measuring chamber, and the getter chamber is communicated with the vacuum chamber.

2. The capacitive pressure sensor according to claim 1, wherein said second substrate is an SOI (Silicon On Insulator) substrate composed of a silicon layer, a buried oxide layer and a base silicon layer, and said vacuum chamber is formed in said silicon layer, and said pressure-measuring chamber and getter chamber are formed in said base silicon layer.

3. The capacitive pressure sensor according to claim 1, wherein a plurality of small projections of silicon oxide are formed on a surface of said capacitance electrode.

4. The capacitive pressure sensor according to claim 2, wherein a plurality of small projections of silicon oxide are formed on a surface of said capacitance electrode.

5. A manufacturing method for a capacitive pressure sensor in which an insulating, first substrate with a capacitance electrode; a second substrate being an SOI substrate including a silicon layer where a vacuum chamber and a diaphragm electrode are formed, a buried oxide layer, and a base silicon layer where a pressure-measuring chamber and a getter chamber are formed; and a third substrate with a gas inlet are bonded in such a manner that said capacitance electrode faces said diaphragm, and said pressure-measuring chamber leads to said gas inlet, the method comprising:
   bonding said first substrate on which said capacitance electrode is formed with said second substrate in which said vacuum chamber is formed by using an anodic bonding method;
   etching said base silicon layer to form said pressure-measuring chamber and said getter chamber;
   removing said buried oxide layer on said pressure-measuring chamber and said getter chamber by an etching technique;
   removing a part of said silicon layer located between said vacuum chamber and said getter chamber to connect said two chambers; and
   bonding said base silicon layer with said third substrate by using an anodic bonding method after a getter is placed in said getter chamber while the inside of said getter chamber is maintained at a vacuum.

6. The manufacturing method according to claim 5, wherein said capacitance electrode is comprised of silicon on which a plurality of small projections of silicon oxide are formed in such a manner that:
   the SOI substrate comprised of a silicon layer, a buried oxide layer, and a base silicon layer is prepared;
   said silicon layer and said buried oxide layer are etched and removed except the portion corresponding to said capacitance electrode;
   said silicon layer is bonded with an insulating substrate;
   said base silicon layer is etched and removed; and
   then said buried oxide layer is patterned to form said projections.

* * * * *